United States Patent [19]

Stevens et al.

[11] Patent Number: 4,934,601
[45] Date of Patent: Jun. 19, 1990

[54] PULSE FOG GENERATOR

[75] Inventors: Robert E. Stevens, Phoenix, Ariz.; Dennis A. Roundebush, Fortville, Ind.

[73] Assignee: Curtis Dyna-Products Corporation, Westfield, Ind.

[21] Appl. No.: 256,909

[22] Filed: Oct. 12, 1988

Related U.S. Application Data

[63] Continuation-in-part of Ser. No. 53,826, May 26, 1987, Pat. No. 4,811,901.

[51] Int. Cl.$^5$ .......................... B05B 7/30; B01F 3/04
[52] U.S. Cl. .................... 239/138; 239/129; 261/DIG. 8; 261/DIG. 68; 123/3
[58] Field of Search ...................... 239/129, 137, 138; 261/DIG. 67-68, DIG. 8; 417/472, 412; 251/73; 137/463; 43/129, 130; 123/3

[56] References Cited

U.S. PATENT DOCUMENTS 1,120,635 12/1914 Vidar ................................ 417/569
1,496,432 6/1924 Robinson ........................ 417/569
4,039,270 8/1977 Hiraga ............................. 417/569

Primary Examiner—Andres Kashnikow
Assistant Examiner—Christopher G. Trainor
Attorney, Agent, or Firm—Woodard, Emhardt, Naughton, Moriarty & McNett

[57] ABSTRACT

In one embodiment of the present invention, a pulse fog generator powered by a resonant intermittent combustion device having a carburetor and a combustion antechamber, includes a starting air supply system for directing a flow of starting air into the antechamber, comprising an inlet/outlet ball check valve mounted over the discharge opening piston chamber within which a piston head is reciprocated by a connecting rod eccentrically mounted to an electric motor. A priming pump is mounted on the carburetor, and comprises a priming fuel chamber hydraulically communicating with the carburetor and a piston reciprocatable within the priming fuel chamber to draw fuel from a fuel tank into the priming fuel chamber and to discharge the fuel from the priming fuel chamber into the carburetor. In lieu of the reciprocatable piston, a resilient priming bulb and valve assembly can supply the priming fuel to the throat passage of the carburetor in another embodiment. An on-off control for the combustion device includes a shut-off plate, disposed over the air inlet of the carburetor, affixed to a slidably mounted plunger so that the shut-off plate can be moved between a position covering and a position displaced from the air inlet. The pulse fog generator has a pressure responsive formulation control apparatus inserted between a formulation tank and means for injecting formulation into the exhaust tube of the combustion device.

7 Claims, 6 Drawing Sheets

PULSE FOG GENERATOR

REFERENCE TO RELATED APPLICATION:

This application is a continuation-in-part of pending application Ser. No. 53,826 filed 5/26/87 now U.S. Pat. No. 4,811,901 by the same inventors and to the same assignee of record.

BACKGROUND OF THE INVENTION

1. Field of the Invention:

The present invention is in the field of fogging devices. In particular, the invention is directed toward fogging devices utilizing the pulse-jet, or resonant intermittent combustion, principle.

2. Description of the Related Art:

Fogging devices, used to generate an insecticide fog, for example, and utilizing the pulse-jet or resonant intermittent combustion principle, are well known in the prior art. An example of such devices is disclosed in Curtis, U.S. Pat. No. 3,993,582, Curtis U.S. Pat. No. 4,030,695, and Stevens et al., U.S. Pat. No. 4,343,719. Each of these patents discloses a fogging apparatus utilizing a resonant, intermittent combustion device, a fuel supply, a formulation supply, a formulation control device, and a starting device. In such prior art devices, the resonant intermittent combustion device is shut off by way of a valve located in the carburetor.

One such prior art device is described in an operator's instruction manual for a pulse-fog generator manufactured by Curtis Dyna-Products Corporation of Westfield, Ind. The components of the pulse fog generator, as well as the operation of the device, is described for the GOLDEN EAGLE Model 2610. The apparatus of the present invention represents an improved version over these prior art devices. In particular, the present invention shows an improved starting system for the resonant intermittent combustion device, an improved combustion device shut off system, and an improved formulation control device.

SUMMARY OF THE INVENTION

A pulse fog generator powered by a resonant intermittent combustion device using a carburetor to feed an air-fuel mixture into a combustion antechamber, includes a starting air supply system for directing a flow of starting air into the antechamber, comprising an inlet/outlet check valve mounted over the discharge opening of a reciprocating piston assembly that is reciprocated by a connecting rod eccentrically mounted between the piston and an electric motor. The pulse fog generator further includes a priming pump for directing a quantity of starting fuel into the carburetor, comprising, in one aspect of the invention, a priming fuel chamber hydraulically communicating with the carburetor and a piston reciprocatable within the fuel chamber to draw fuel from a fuel tank into the priming fuel chamber and to discharge the fuel from the chamber into the carburetor. In another aspect of the invention, the priming pump includes a resilient primer bulb having an inlet for drawing fuel through the metering chamber of the carburetor, and an outlet for discharging fuel directly into the central throat passage of the carburetor. An on-off control system for the pulse fog generator comprises a shut-off plate disposed over the air inlet for the carburetor affixed to a slidably mounted plunger so that the shut-off plate can be moved between a position covering and a position displaced from the air inlet. In one aspect of the invention, a common valve body is provided to mount the priming pump and the on-off control system onto a retro-fitted carburetor.

BRIEF DESCRIPTION OF THE DRAWINGS

FIG. 5b is a top view of the pump body shown in FIG. 5a.

FIG. 7b is a fragmentary side sectional view of the carburetor and priming pump assembly shown in FIG. 7a.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated embodiment, and such further applications of the principles of the invention as illustrated therein being contemplated as would normally occur to one skilled in the art to which the invention relates.

Figure 1:
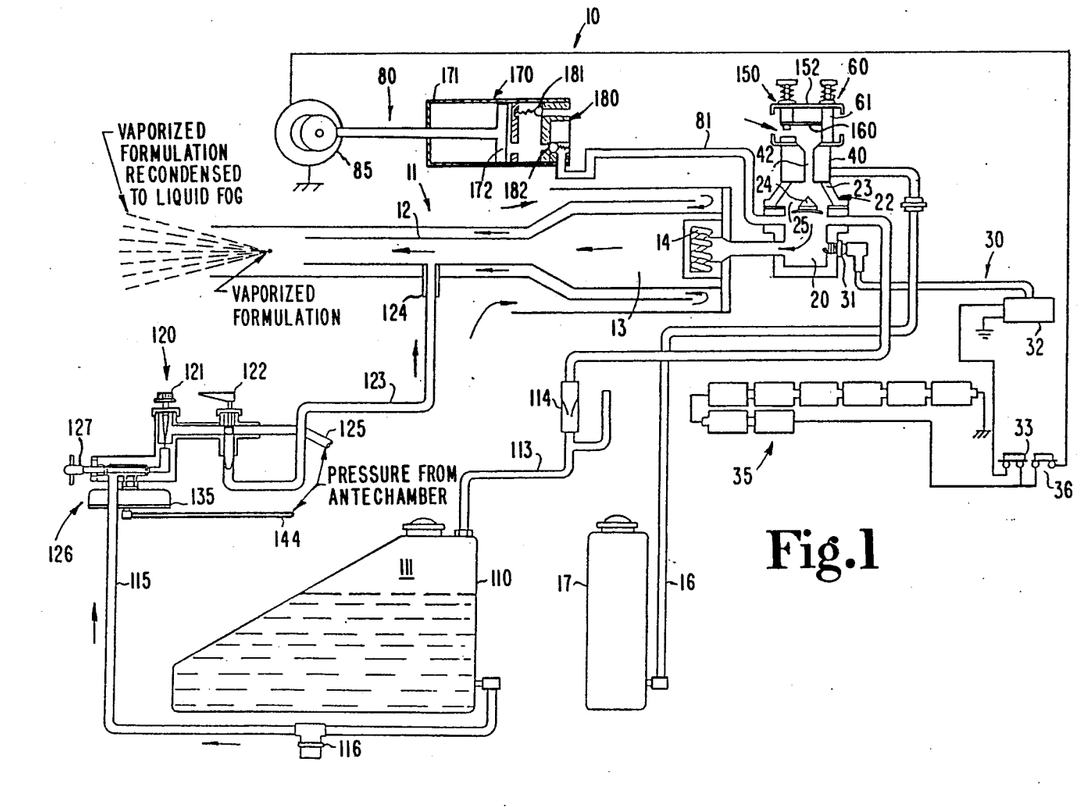
FIG. 1 is a schematic view of the primary components of the pulse fog generator of one embodiment of the present invention.

Referring first to FIG. 1, the various components of the pulse fog generator 10 of Applicants' preferred embodiment are schematically shown. The pulse fog generator 10 includes a resonant combustion device 11 comprising an exhaust tube 12, communicating at one end with a combustion chamber 13, the combustion chamber 13 having a thermal glow coil 14 functioning as a flame holder.

Flow of fuel and air into a combustion antechamber 20 and thence into the combustion chamber is controlled by a fuel-air inlet valve 22, comprising a housing 23 which is transversely divided by a conventional petal-type check valve 24 into an upper chamber 25 and the combustion antechamber 20. The petal type check valve 24 is conventional and permits one-way introduction of a combustible fuel-air mixture into the combustion antechamber 20. An electrical spark generating system 30 has an electrode or spark plug 31 extending into the combustion antechamber and energized by a coil 32. The spark generating system is enabled by a first switch 33 connected to a power supply 35 during starting of the engine.

A carburetor 40 is disposed above the fuel-air inlet valve 22 and has a central throat passage 42. The carburetor 40 is a standard "pulse pump" type carburetor that has been modified for Applicants' invention as will be described herein. The central throat passage 42 extends through the carburetor and provides the primary air inlet into the carburetor and antechamber.

A priming pump assembly 60 is mounted atop the carburetor 40 and disposed generally above the central throat passage 42. An on-off control valve 150 is mounted on a mounting plate 152 that is affixed to a priming pump body 61 of the priming pump assembly 60. The on-off control valve 150 comprises a shut-off plate 160 that is situated above the central throat passage 42 and is adapted to cover the throat passage in order to terminate the flow of air into the carburetor when it is desired to shut the pulse fog generator 10 off. The priming pump 60 provides a means to inject fuel into the carburetor antechamber 20 during initial startup of the pulse fog generator. Once the generator is operating, a fuel delivery line 16 continuously supplies fuel from the fuel tank 17 to the carburetor.

Figure 3:
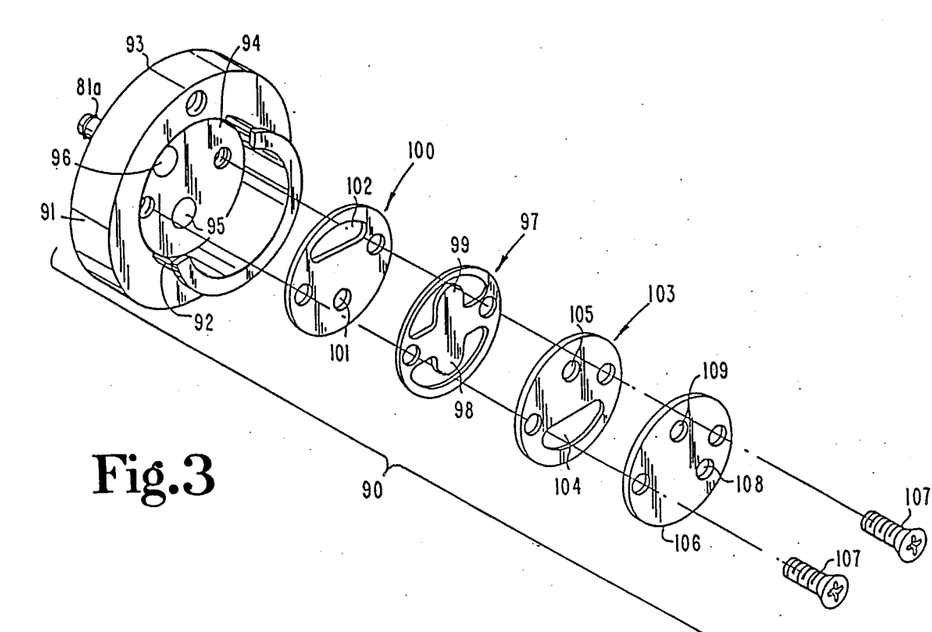
FIG. 3 is an enlarged exploded view of an air pump body assembly of the starting air supply system shown in FIG. 2.

A starting air supply system 80 injects air into the antechamber 20 during startup of the resonant combustion device 11. In one embodiment of the invention, the starting air supply system includes a bellows driven by a motor assembly, that intakes and expels air through an air pump body assembly 90 (FIG. 3) into the starting air line 81. The details of this bellows and pump body assembly 90 are discussed in the co pending parent application Ser. No. 53,826, at pages 7-8 and 10-12, which are incorporated herein by reference.

In another embodiment, the starting air supply system 80 comprises a piston assembly 170, driven by a motor assembly 85, that intakes and expels air through an air pump body assembly 180 into a starting air line 81. The starting air line 81 communicates from the piston assembly 170 to the antechamber 20 to provide air to be mixed with fuel injected into the antechamber by the priming pump 60 during startup of the resonant combustion device 11.

The pulse fog generator 10 further comprises a formulation tank 110 that stores the liquid mixture or formulation 111 to be vaporized in the exhaust tube 12 during operation of the generator. A formulation pressure line 113 communicates between the combustion antechamber 20 and the formulation tank 110, through a formulation tank pressurizing valve 114, in order to pressurize the formulation tank in response to the operation of the pulse fog generator. A formulation tank line 115 exits the formulation tank 110 as shown and passes through a formulation filter 116. The formulation tank line 115 communicates with a metering/shut-off valve assembly 120 which comprises a formulation shut-off assembly 126 having a shut-off valve 127 and a diaphragm actuator 135, a formulation metering valve 121, and a three-way valve 122. The design and operation of the shut-off valve 127 and the diaphragm actuator 135 will be explained further herein.

The formulation metering valve 121 controls the rate of flow of formulation exiting the formulation tank line 115. The three-way valve 122 provides a means to flush the formulation lines once the fogging operation is complete. An outlet line 123 communicates from the three way valve 122 to the formulation injection nozzle 124 opening into the exhaust tube 12. A pressure line 125 extending from the antechamber to the three-way valve 122 pressurizes the formulation flowing through the outlet line 123 to force the formulation through the formulation injection nozzle 124 into the exhaust tube 12.

In the operation of the pulse fog generator 10, fuel and air are continuously drawn through the carburetor 40 and antechamber 20 into the combustion chamber 13. The thermal glow coil 14, when heated, causes the fuel-air mixture to burn, generating heated high velocity gases. The high velocity gases exit the combustion chamber 20 into the exhaust tube 12 passing by the formulation injection nozzle 124. The venturi effect of the high velocity gases passing over the formulation injection nozzle 124, coupled with the pressurized formulation flowing through the outlet line 123, causes the formulation to enter the exhaust tube 12 and the flow of high velocity gases. The formulation is vaporized in the exhaust tube, but is subsequently recondensed to a liquid fog shortly after exiting the exhaust tube 12.

Figure 2:
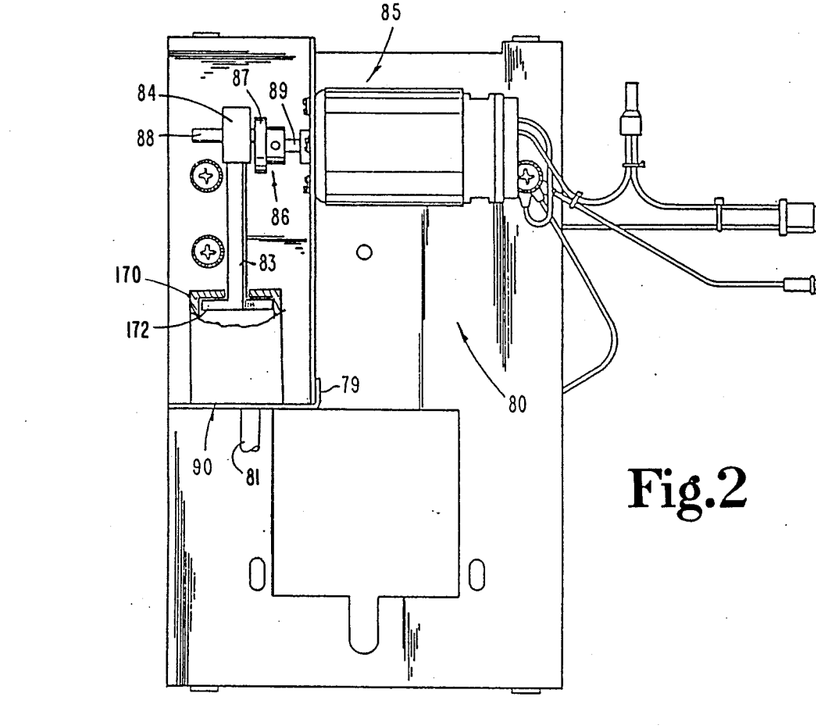
FIG. 2 is a fragmentary top view of the starting air supply system of a preferred embodiment of the present invention.

Having generally described the operation of the pulse fog generator, detailed description of Applicants' preferred embodiment will follow. In this embodiment, the starting system for the resonant combustion device 11, described with reference to FIGS. 1 and 2, comprises the starting air supply system 80. The connecting rod 83 terminates at one end in a rod end 84. The rod end 84 is eccentrically and pivotably mounted to an eccentric assembly 86. In this embodiment, the eccentric assembly 86 comprises a disc 87 having a pin 88 affixed thereon, as shown in FIG. 2. The pin extends through a bore (not shown) in the rod end 84. The pin 88 is mounted off center on the disc 87 so that, as the disc rotates, the rod end 84 moves in an eccentric fashion. The electric motor assembly 85 includes a rotating output shaft 89. The disc is mounted at the end of a motor output shaft 89. Thus, the output shaft, and consequently the eccentric, rod end, and connecting rod are driven by the electric motor. Since the rod end 84 and connecting rod 83 are eccentrically mounted to the rotating eccentric assembly 86 and output shaft 89, the rotational motion of the output shaft is translated to a generally reciprocating motion of the connecting rod.

The other end of the connecting rod 83 is suitably connected to a piston head 172. The piston head 172 is slidingly situated within a piston chamber 171. The reciprocating motion of the connecting rod 83, consequently, extends and retracts, or reciprocates, the piston head 172 within the piston chamber 171. An air pump valve assembly 180 is situated at the open end of the piston chamber 171. The air pump valve assembly 180 includes an inlet ball check valve 181 and an outlet ball check valve 182, each alternately operating as the piston head is reciprocated to draw atmospheric air into the pump chamber and expel air out along the starting air line 81.

Referring to FIG. 1, the electric motor that drives the bellows is connected to the power supply 35 via a second switch 36. Thus, when the second switch 36 is depressed, electricity is provided to the electric motor, energizing the motor and starting the air pumping operation. The starting air supply system 80 works in cooperation with a spark generating system, in this case the coil 32 and spark plug 31 shown in FIG. 1, to comprise the starting system for the resonant combustion device.

Fuel introduced into the antechamber mixes with the starting air and is ignited by the spark plug.

The outlet ball check valve 182 in the air pump body assembly 180 prevents the heated gases resulting from the explosion in the antechamber from escaping through the starting air line 81 and starting air supply system 80. However, the outlet ball check valve does not prevent air from being drawn into the antechamber by the vacuum resulting after the explosion, as the air pump valve assembly 180 operates essentially as an auxiliary air supply. During the vacuum pulse, the outlet ball check valve 182 of the check valve wafer is flexed, as well as the inlet ball check valve 181, so that air passes freely through the air pump valve assembly and into the starting air line to the antechamber.

In one alternative to the present embodiment, the spark generating system 30 and the starting air motor assembly 85 are wired in parallel, and the first and second switches 33 and 36 are combined into one switch. In this instance, depressing the single switch starts the electric motor which ultimately introduces starting air into the combustion antechamber, while also energizing the coil causing the spark plug to spark.

The starting system of the present embodiment represents an improvement over the starting systems of the prior art that use a hand-operated air pump. Not only is operation of the hand pump to supply starting air to the antechamber cumbersome, it is also physically difficult for the operator. As the hand pump heats up, the piston expands, thereby increasing the force required to reciprocate the pump. In this embodiment, hand operation has been replaced by the electrical air supply system.

The starting system for the resonant combustion device 11 of the pulse fog generator 10 in Applicants' preferred embodiment also comprises a priming pump assembly 60. As illustrated in FIG. 1, the priming pump assembly 60 is mounted atop the carburetor 40 over the central throat passage 42. The details of one embodiment of the priming pump assembly will be illustrated with reference to FIG. 4.

Figure 4:
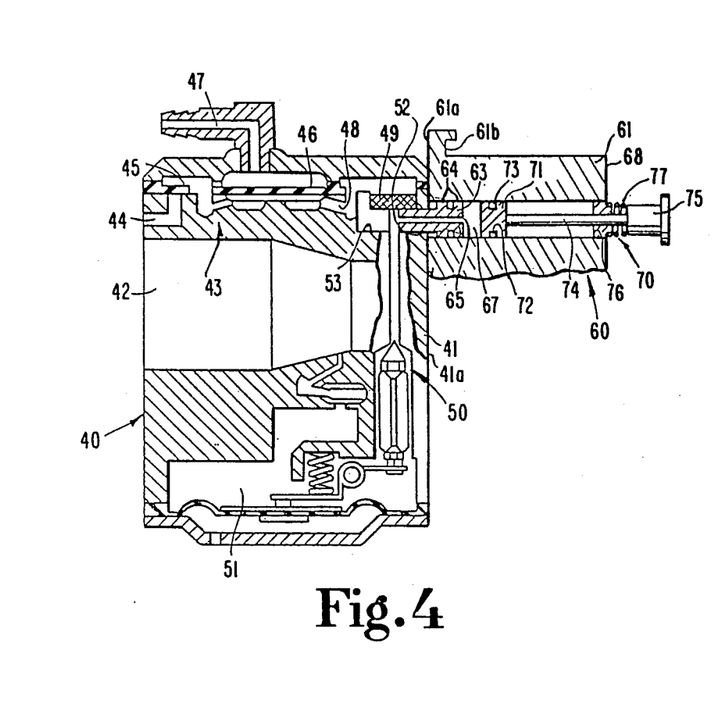
FIG. 4 is a fragmentary side sectional view of a carburetor with the priming pump assembly of one embodiment of the present invention mounted thereon.

As background information, the relevant details of the carburetor will be first described. The carburetor 40 includes a fuel pump assembly 43, which comprises a fuel inlet orifice 44, a fuel inlet valve 45, a fuel pump diaphragm 46, a pressure/vacuum pulse inlet 47, and a fuel outlet valve 48. Fuel from the fuel tank 17 (FIG. 1) passes through the fuel delivery line 16 to the fuel inlet orifice 44 of the carburetor 40. The fuel inlet valve 45 controls the flow of fuel into the carburetor, and prevents the backflow of fuel or air into the fuel delivery line 16. The fuel pump diaphragm 46 creates a vacuum when flexed which draws fuel into the carburetor through the fuel inlet valve 45. The fuel pump diaphragm 46 is flexed in response to the alternating pressure-vacuum pulses generated in the antechamber 20 by the operation of the resonant combustion device that are transmitted into the carburetor through the pressure/vacuum pulse inlet 47. The fuel inlet valve 45 is responsive to the flexing of the fuel pump diaphragm 46 so that it closes the fuel inlet orifice 44 when the diaphragm is flexed during the pressure pulse. The fuel inlet valve 45 is flexed to the open position when the diaphragm is retracted during the vacuum pulse. As the fuel pump diaphragm flexes, the fuel is pulled into the carburetor during the vacuum pulse, and pushed through the fuel outlet valve 48 during the pressure pulse.

The fuel in the carburetor passes through a fuel filter 49 and a fuel passageway 52, past an inlet needle valve 50, and into a metering chamber 51. Once in the metering chamber 51, the fuel is drawn into the central throat passage 42 of the carburetor by the venturi effect of air passing into the carburetor and through the central throat passage into the fuel/air inlet valve 22 and combustion antechamber 20. Once the engine is operating, air is constantly flowing through the carburetor and the central throat passage so that the fuel is automatically drawn into the carburetor and ultimately into the combustion antechamber. Furthermore, in an operating condition, the fuel pump is also operational. However, in a start up condition, the fuel pump is disabled, and no air is flowing into the carburetor sufficient to create a venturi effect to draw the fuel from the metering chamber into the carburetor. Consequently, the priming pump assembly is required to withdraw the fuel from the fuel tank and inject it directly into the carburetor so that an initial air and fuel mixture can be ignited.

Figure 5A:
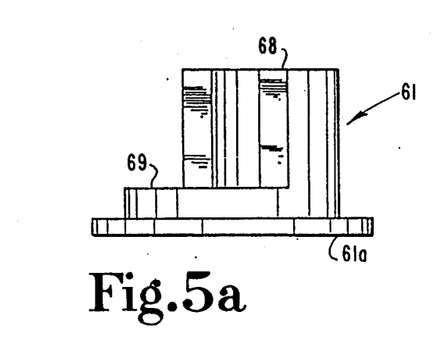
FIG. 5a is a side view of the pump body of the priming pump assembly shown in FIG. 4.
Figure 5B:
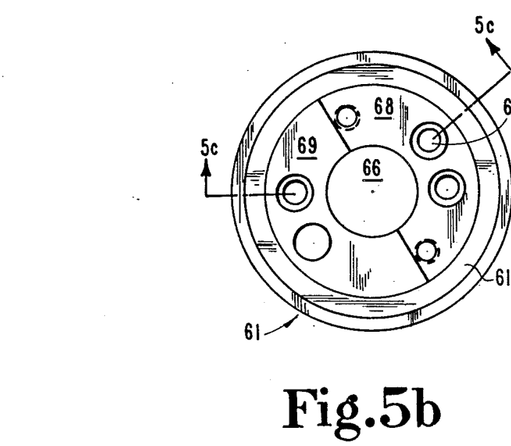
Figure 5C:
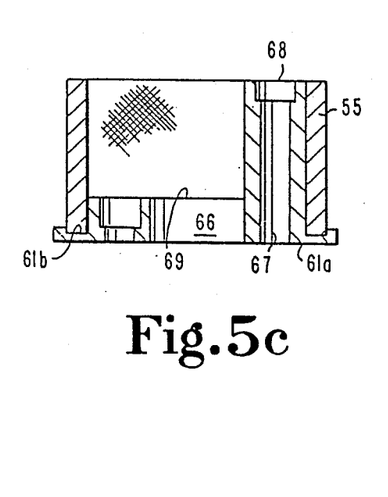
FIG. 5c is a side sectional view of the pump body shown in FIG. 5b taken along the line 5c–5c and viewed in the direction of the arrows, shown with an air filter installed.

As previously noted, the priming pump assembly 60 of Applicants' invention is mounted directly on the carburetor 40. In this embodiment, an adaptor fitting bore 53 is drilled through the carburetor body 41 into the fuel passageway 52 directly adjacent the fuel filter 49. A pump adapter 63 is pressed into this bore, the pump adapter 63 having a pair of circumferentially sealing lands 64 and a central bore 65 communicating with the fuel passageway 52. A priming pump body 61, shown in detail in FIGS. 5a-5c, comprises a mounting surface 61a for mounting flush against a reciprocal mounting surface 41a on the carburetor body 41. A circumferential filter groove 61b receives an air intake screen or filter 55 therein (FIG. 5c). A central air intake bore 66 extends through the priming pump body 61 to provide a flow path for atmosphere air into the central throat passage 42 of the carburetor 40.

The priming pump body 61 further includes a priming fuel chamber 67 adapted to accept the circumferential sealing lands 64 of the pump adapter 63 in a press fit. The priming pump body is appropriately fixed on the carburetor, such as by bolts, so that the pump adapter is in simultaneous press-fit engagement in the adapter fitting bore 53 of the carburetor and in the priming fuel chamber 67 of the priming pump body 67.

Referring again to FIG. 4, a priming piston assembly 70, having a piston head 71 with an O-ring groove 72 and an O-ring 73 resiliently mounted thereto, a piston rod 74 connected to the piston head, and a knob 75 attached at the distal end of the piston rod 74, is situated in the priming fuel chamber 67 in the priming pump body 61. A retaining member 76, such as a press fit hollow plug or a snap ring, located at the distal end of the chamber 67, prevents the piston head 71 from being completely withdrawn from the chamber. A biasing, or return, spring 77 situated between the retaining member 76 and the knob 75 biases the priming piston assembly 70 away from the carburetor and provides a return force against the knob 75 when the priming piston is pumped by the operator.

In operation, the priming piston head 71 is withdrawn in the priming fuel chamber 67. As the piston head 71 is withdrawn, a vacuum forms in the priming fuel chamber 67 as well as in the fuel passageway 52 in the carburetor 40. This vacuum in turn opens the fuel inlet valve 45 and draws fuel from the fuel tank 17 into the carburetor 40, in a fashion similar to the operation of the fuel pump diaphragm previously described. Once the fuel is withdrawn from the fuel tank into the fuel passageway 52 of the carburetor, the piston head 71 is stroked back into the chamber 67. The piston head exerts a pressure against the fuel which closes the fuel inlet valve 45 and causes the fuel to flow through the fuel passageway 52 past the inlet needle valve 50 and into the metering chamber 51. Since the fuel withdrawn by the priming piston is being forced under pressure by the priming piston head, the fuel flows freely into central throat passage 42 of the carburetor 40, without the necessity of the venturi effect created by air flowing through the central throat passageway 42. Thus, it can be seen that in the initial start up of the resonant combustion device of the pulse fog generator, fuel is injected into the combustion antechamber 20 solely by manual operation of the priming piston, since the fuel pump diaphragm 46 and pressure/vacuum pulse inlet 47 are inactive.

In starting the resonant combustion device using the starting system of Applicants' preferred embodiment, several strokes of the priming pump assembly may be necessary to inject a sufficient quantity of fuel into the antechamber. Air is also forced into the antechamber to mix with the fuel. The resulting fuel/air mixture is ignited by the spark generating system 30 and the resonant combustion device becomes self-sustaining. Once the initial explosion of the fuel/air mixture has occurred, the starter system becomes redundant and is no longer operational. At this point, the priming pump is no longer needed to withdraw and pump fuel into the carburetor, as the fuel pump diaphragm 46 is now activated by the alternating pressure/vacuum pulses transmitted through the pulse inlet 47. The O-ring 73 on the priming piston head 71 prevents any fuel from leaking from the priming fuel chamber 67.

The starter system of the present embodiment comprising the primary pump assembly 60 represents an improvement over the priming systems of earlier devices. In earlier devices, the fuel priming function was performed by operation of a manual air pump used to temporarily pressurize the fuel tank, causing fuel to be injected from the fuel delivery line into the carburetor. As described above, use of the manual pump is cumbersome and physically difficult. The priming pump assembly is easier to operate, having a short stroke of 1 to 1½ inches. Furthermore, there is no need to pressurize the fuel tank during the priming operation, which translates to a simplified fuel control system. The present embodiment of the priming pump assembly of Applicants' novel starting system allows for a minor modification to a stock pulse pump type carburetor and provides an improved fuel priming operation for the start up of the resonant combustion engine.

Figure 6:
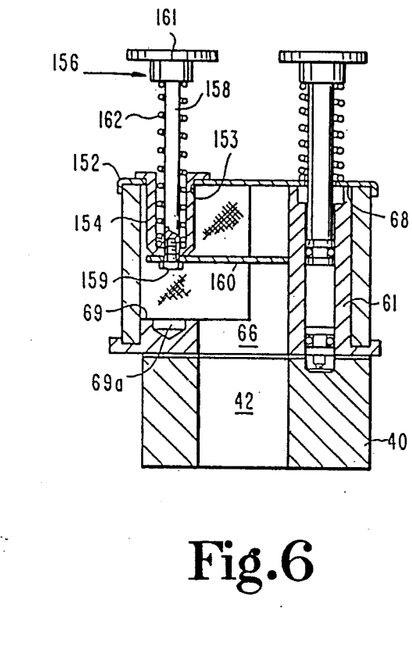
FIG. 6 is a side sectional view of the on-off control valve of one embodiment of the present invention, shown mounted on a priming pump body and carburetor.

The preferred embodiment of Applicants' invention includes an on/off control valve 150 mounted directly above the central throat passage 42 of the carburetor 40 to terminate the airflow through the carburetor to the antechamber 20. A mounting plate 152 is affixed to the distal surface 68 of the priming pump body 61. Referring to FIG. 6, the mounting plate 152 includes a first bore 153 through which a bushing 154 is pressed. The bushing 154 is elongated and extends below the bottom surface of the mounting plate 152, as shown in FIG. 6. A plunger assembly 156, comprising a plunger rod 158 and a shut-off plate 160, affixed at one end of the rod by way of a pin or screw, is slidably situated within the bushing 154. A knob 161 is pressed or threaded onto the other end of the rod 158. The rod also passes through a helical spring 162 which is situated between the bushing and the knob 161 so that the spring reacts against the knob tending to push the plunger assembly 156 away from the central throat passage 42.

In the present embodiment, the priming pump body 61 described above further comprises a shut-off contact surface 69. The plunger rod 158 is of sufficient length that, when the rod is depressed, the shut-off plate 160 contacts flush against the contact surface 69, covering the air intake bore 66 in the pump body and, consequently, the central throat passage 42. A recess 69a in the contact surface 69 is situated to receive the head of the pin or screw 159 to allow the shut-off plate 160 to completely seal off the air intake bore 66.

The on/off control valve 150 of the present embodiment is used to prevent air from flowing into the carburetor, which starves the resonant combustion device 11 causing it to shut down. The on/Off control valve is operated by depressing the knob 161 and plunger rod 158 which, in turn, pushes the shut-off plate 160 down into contact with the contact surface 69 of the pump body and covering the air intake bore 66 and central throat passage 42. Once the flow of air through the carburetor into the combustion antechamber is interrupted, the pressure/vacuum pulse cycle is terminated and the resonant combustion device 11 stops. Once the device 11 stops, the plunger assembly 156 can be released, and the spring 162 automatically retracts the plunger rod, and the shut-off plate, away from the air intake bore 66. The spring 162 also serves to keep the shut-off plate 160 away from the air intake bore 66 during operation of the engine.

The on/off control valve 150 of this embodiment represents an improvement of shut-off systems in similar resonant combustion devices and pulse fog generators, in particular. In the prior system, the combustion device was shut-off by manipulation of a valve or vane in the carburetor itself to stop the flow of fuel and air into the combustion antechamber. Applicants' invention simplifies the shut-off mechanism since a valve interior of the carburetor, along with the requisite mechanical devices to manipulate the valve, is not required. In addition, Applicants' on/off control valve is biased to permit airflow, unlike most prior systems.

Figure 7A:
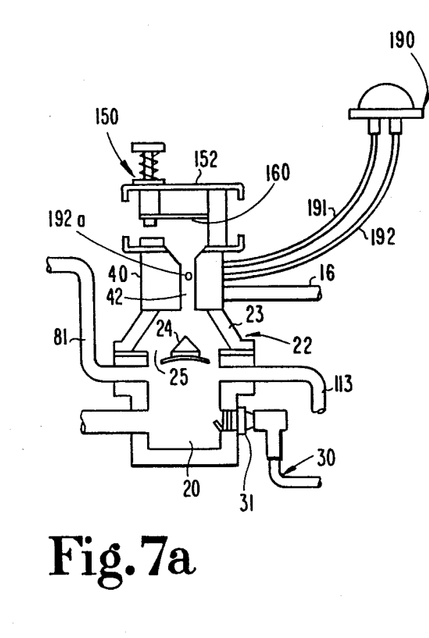
FIG. 7a is a partial schematic view of the carburetor and priming pump assembly of the pulse fog generator of another embodiment of the present invention.
Figure 7B:
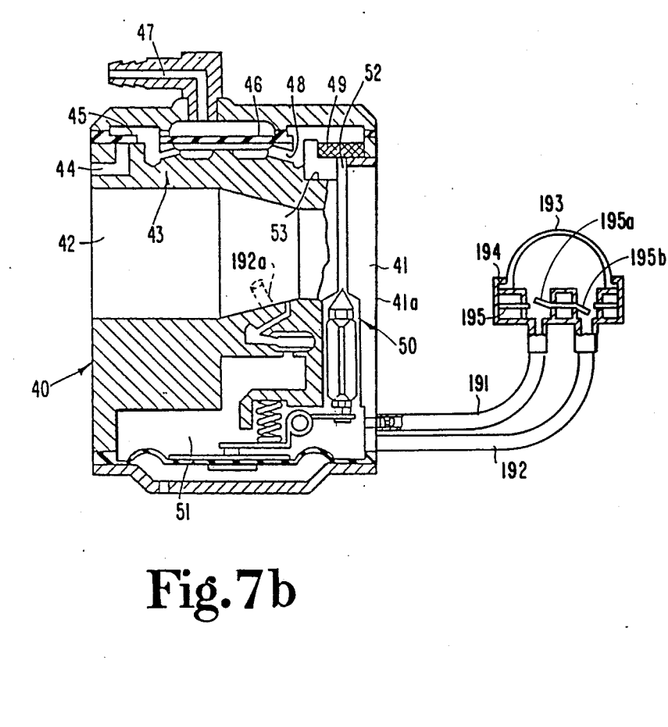

In a different aspect of the invention, the priming pump assembly 60 of the previous embodiment is replaced by a priming bulb assembly 190, as illustrated in FIGS. 7a and 7b. The priming bulb assembly 190 is mounted on the a carburetor having the same features as the carburetor 40 described above, with the exception that different fluid connections between the carburetor and the priming bulb assembly are required. The priming bulb assembly 190 includes a priming fuel inlet line 191 through which the priming fuel is drawn, and a priming fuel outlet line 192 that opens into the carburetor throat 42 at an outlet port 192a. The priming bulb assembly 190 is of a conventional design in which a flexible resilient bulb 193 is mounted on a priming valve body 194. A valve plate 195 is mounted within the priming valve body 194 and includes an inlet valve 195a and an outlet valve 195b. The fuel inlet and outlet lines 191 and 192, respectively, are appropriately connected to the priming valve body 194 to communicate with the proper valves. In this embodiment, the bulb 193 is transparent or translucent so that a visual indication is available that priming fuel is present in the bulb for injection into the carburetor.

The priming bulb assembly 190 of this embodiment operates in a unique manner relative to the prior art devices. When the priming bulb 193 is initially depressed, air or fumes in the bulb are expelled from the bulb through outlet valve 195b and priming fuel outlet line 192 and outlet port 192a into the carburetor. When the bulb resiliently returns to its pre-determined undeformed shape, a vacuum is formed inside the bulb that pulls the inlet needle valve 50 down and draws fuel from the fuel tank through the carburetor, through the priming fuel inlet line 191 and into the priming bulb 193. When the bulb is next depressed, the fuel within the bulb is expelled through the priming fuel outlet line 192 and outlet port 192a into the carburetor throat 42. When the bulb is depressed, inlet valve 195a seats in its closed position, and when the bulb rebounds to its undeformed shape, the outlet valve 195b seats in its closed position. The resilience of the bulb 193 is sufficiently great to draw a vacuum in the metering chamber 51 sufficient to pull the metering needle valve 50 off its valve seat and to draw starting fuel from the fuel tank 17.

With this embodiment, the priming fuel is injected directly into the carburetor throat, rather than through the metering chamber 51, as in the previous embodiment. In addition, the use of the priming bulb simplifies the connection between the priming bulb assembly 190 and the carburetor body to eliminate the pump adaptor 63 of the previous embodiment. On the other hand, the priming bulb assembly 195 requires valving separate from the carburetor valving, unlike the priming piston assembly 60 of the former embodiment.

Applicants' preferred embodiment includes a formulation shut-off assembly 126 interposed between the formulation tank outlet line 115 and the formulation metering valve 121. This formulation shut-off assembly 126 terminates the flow of formulation into the exhaust tube 12 of the resonant combustion device 11 once the pressure/vacuum pulse cycle is interrupted in the operation of the device, such as would occur when the device 11 ran out of fuel. Although once the pressure/vacuum pulse cycle of the engine is interrupted, the engine has essentially come to a stop, residual fuel/air mixture in the combustion chamber 13, combined with the formulation mixture that may flow into the exhaust tube 12, may be ignited by the glow coil causing an explosion or fire. Furthermore, even in the absence of residual fuel/air mixture in the combustion chamber, the intense heat in the combustion chamber and exhaust tube can also cause the formulation mixture to explode or catch fire. This danger is greatly minimized if the flow formulation into the discharge tube is terminated immediately when the operation of the engine is terminated. The formulation shut-off assembly 126 performs this function. The function and structure of the formulation shut-off assembly of the invention is described in more detail in Applicants' co-pending parent application Ser. No. 53,826 at pp. 22–28, which is incorporated herein by reference.

The formulation shut-off valve assembly 126 of Applicants' preferred embodiment represents an improvement over the "dead man" throttle of the prior art. The dead man throttle, such as the throttle described in the Curtis patent, U.S. Pat. No. 4,030,655, requires that the operator constantly press the throttle lever in order to maintain flow of the formulation into exhaust tube of the pulse fog generator. In order to shut off the flow of the formulation in an emergency situation, such as when the engine dies after having run out of fuel, it is incumbent upon the operator to quickly release the dead man throttle, thereby terminating flow of the formulation. The formulation shut-off valve assembly of Applicants' invention makes this safety feature entirely automatic and dependent only upon the continued operation of the resonant combustion device of the pulse fog generator.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A pulse fog generator including a resonant intermittent combustion device composed of a combustion chamber and an exhaust tube communicating with the combustion chamber, one end of the tube discharging gases resulting from, and discharged under pressure produced by, combustion in the combustion chamber, an antechamber communicating with said combustion chamber for providing a fuel-air mixture to said combustion chamber, a carburetor for supplying a fuel-air mixture to the antechamber and including a central throat passage, through which intake air flows during operation of the combustion device, a spark generating system, including a power source, for igniting the fuel-air mixture in the antechamber, a tank providing a reservoir of formulation and a formulation line through which formulation flows from the tank to the exhaust tube, the pulse fog generator comprising:

electric starting air supply means for pumping atmosphere air into the antechamber when the resonant intermittent combustion device is being started;

means for terminating the flow of air through the central throat passage of the carburetor when the resonant intermittent combustion device is operating, including;

a shut-off plate movable between a first position preventing the flow of air through the central throat passage and a second position allowing the flow of air through the central throat passage;

a plunger attached to said shut-off plate, operable to move said shut-off plate between said first and second positions; and biasing means for normally biasing said shut-off plate into said second position; and a mounting body removably mounted on the carburetor and including;

means for for slidably mounting said plunger on the carburetor so that said plunger can be operated to move said shut-off plate into said first position; and priming pump means for directing a quantity of starting fuel into the central throat passage of the carburetor when the resonant intermittent combustion device is being started.

2. The pulse fog generator of claim 1 further having a fuel supply, wherein: said priming pump means includes a resilient compressible bulb hydraulically disposed between the fuel supply and the central throat passage, whereby said bulb is manually compressible to draw fuel from the fuel supply and to discharge fuel from said bulb into the throat passage of the carburetor.

3. A starting air supply system for a resonant intermittent combustion device having a combustion antechamber, a fuel-air supply for supplying a fuel-air mixture to the antechamber, and a spark generating system, including a power source, for igniting the fuel-air mixture in the antechamber, the starting air supply system comprising:
- an electric motor, electrically connected to the power source, including a movable output;
- an air pump including a piston cylinder, having a discharge opening at one end, and a piston head reciprocatingly disposed within said piston cylinder;
- means, connected between said output of said electric motor and said piston head, for reciprocating said piston head within said piston cylinder;
- check valve means engaged within said piston cylinder adjacent said discharge opening for controlling the flow of air into and out of said piston cylinder as said piston head reciprocates therein when the resonant intermittent combustion device is to be started; and
- a starting air supply conduit extending from said check valve means and opening into the antechamber to direct a flow of starting air therein,
- wherein said check valve means is further operable to allow atmosphere air to be drawn through said air supply conduit into said antechamber when the resonant intermittent combustion device is operating.

4. The starting system of claim 3, wherein:
- said movable output includes a rotatable output shaft; and
- said means for reciprocating includes a rod, eccentrically mounted to said output shaft at one end and engaged to said piston head at the other end of said rod.

5. A starting system for a resonant intermittent combustion device having a combustion antechamber, a fuel supply, a carburetor for supplying a fuel-air mixture into the antechamber and including a throat passage communicating with said antechamber, a mounting surface, a fuel inlet communicating with said fuel supply, a metering chamber having a fuel outlet opening into said throat passage and a fuel passageway between the fuel inlet and the metering chamber, the fuel passageway having a needle valve disposed therein for controlling the flow of fuel into the metering chamber, and a spark generating system, including a power source, for igniting the fuel-air mixture in the antechamber, the starting system comprising:
- starting air supply means for pumping atmosphere air into the antechamber;
- priming pump means, including a pump body, adapted to be removably mounted on the mounting surface of the carburetor, for directing a quantity of starting fuel into the throat passage to be mixed with the air in the antechamber, further;
- said pump body defining a priming fuel chamber hydraulically communicating with the fuel passageway of the carburetor; and
- said priming pump means further including a priming pump in fluid communication with said priming fuel chamber and operable during an intake stroke of said pump to draw fuel from the fuel supply through the fuel inlet, through the passageway directly into said priming fuel chamber, and is operable during a priming stroke of said pump to discharge fuel from said priming fuel chamber, through the passageway to displace the needle valve so that priming fuel passes through the metering chamber and into the throat passage of the carburetor;
- a first adapter bore extending from the mounting surface to the fuel passageway of the carburetor;
- a priming pump adapter sealingly engaged at one end of said adapter within said first adapter bore, extending outward from the mounting surface and having a priming bore therethrough communicating with the fuel passageway; and
- wherein said pump body includes a second adapter bore defining said priming fuel chamber and receiving a second end of said priming pump adapter in press-fit engagement to prevent leakage of fuel from the interface of said priming pump means and the mounting face of the carburetor.

6. The starting system of claim 5, wherein:
- said priming pump means includes a piston reciprocatable within said priming fuel chamber defined by said second adapter bore and operable in said intake and priming strokes.

7. An on-off control system for a resonant intermittent combustion device having a combustion antechamber and a carburetor for supplying a fuel-air mixture to the antechamber including a central throat passage, through which intake air flows during operation of the resonant intermittent combustion device, opening at one end into the antechamber and at the other end to the atmosphere, said on-off control system comprising:
- a shut-off plate disposed over the atmosphere opening of the central throat passage and adapted to cover the opening to terminate the flow of intake air therethrough;
- a plunger attached to said shut-off plate, operable to move said shut-off plate between a first position covering the atmosphere opening and a second position displaced from the atmosphere opening; and
- a mounting body removably mounted on said carburetor and including means for slidably mounting said plunger on the carburetor so that said plunger can be operated to move said shut-off plate into said first position and further including biasing means for normally biasing said shut-off plate into said second position.

* * * * *